United States Patent
Flener et al.

(10) Patent No.: US 9,120,367 B2
(45) Date of Patent: Sep. 1, 2015

(54) MODULAR DOOR BEAM ASSEMBLY AND METHOD OF ASSEMBLY

(71) Applicant: Henkel AG & Co. KGaA, Duesseldorf (DE)

(72) Inventors: Michael J. Flener, Pleasant Ridge, MI (US); Christopher Liddiard, Rochester Hills, MI (US); Ulhas Grover, South Lyon, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/826,051

(22) Filed: Mar. 14, 2013

(65) Prior Publication Data
US 2014/0260079 A1 Sep. 18, 2014

(51) Int. Cl.
*B60J 5/00* (2006.01)
*B60J 5/04* (2006.01)

(52) U.S. Cl.
CPC .............. *B60J 5/0437* (2013.01); *B60J 5/0443* (2013.01); *Y10T 156/10* (2015.01)

(58) Field of Classification Search
USPC ..................................................... 296/146.6
See application file for complete search history.

(56) References Cited

U.S. PATENT DOCUMENTS

| | | | |
|---|---|---|---|
| 3,868,796 A | 3/1975 | Bush | |
| 4,922,596 A | 5/1990 | Wycech | |
| 4,950,348 A | 8/1990 | Larsen | |
| 4,978,562 A | 12/1990 | Wycech | |
| 5,547,152 A | 8/1996 | Krock | |
| 5,580,119 A | 12/1996 | Uchida | |
| 5,884,960 A | 3/1999 | Wycech | |
| 6,135,541 A | 10/2000 | Geise | |
| 7,041,193 B2 | 5/2006 | Bogert | |
| 8,444,208 B2 | 5/2013 | Inoue | |
| 2012/0163906 A1* | 6/2012 | Inoue et al. | ................... 403/265 |

FOREIGN PATENT DOCUMENTS

WO     WO99/17947     4/1999

* cited by examiner

*Primary Examiner* — Joseph D Pape
(74) *Attorney, Agent, or Firm* — Mary K. Cameron

(57) ABSTRACT

A modular beam assembly for installation on an automobile panel is provided. The modular beam assembly has an elongate beam inserted through a plurality of collars forming a slip fit and a retaining cap inserted on at least one end of the elongate beam to retain the elongate beam within the collars. A heat-curable adhesive material may be applied to the collars, the elongate beam, and the retaining cap. The assembly allows displacement of the elongate beam within the collars until the adhesive material is cured.

17 Claims, 6 Drawing Sheets

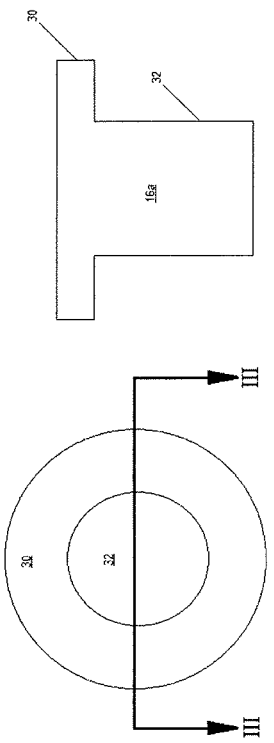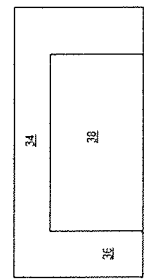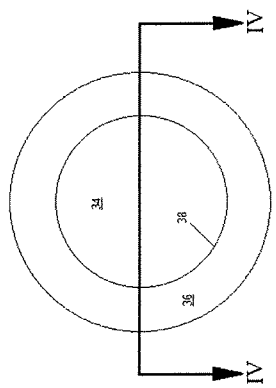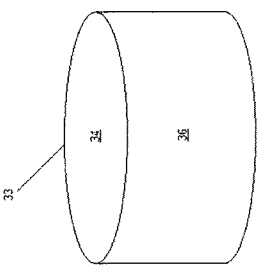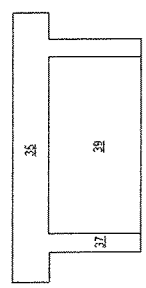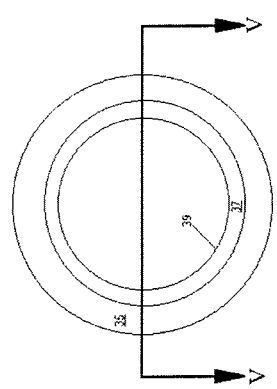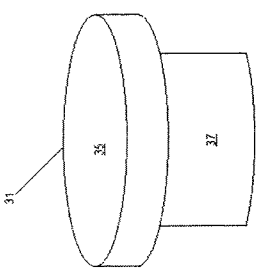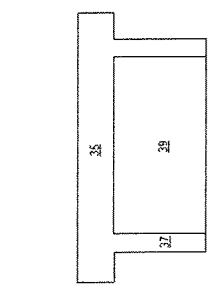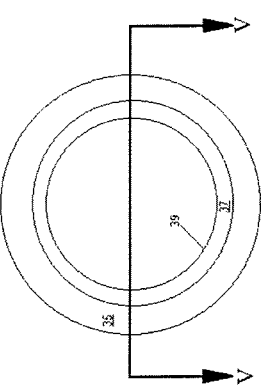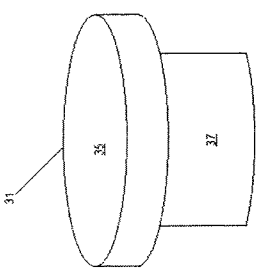

MODULAR DOOR BEAM ASSEMBLY AND METHOD OF ASSEMBLY

FIELD OF THE INVENTION

The present invention generally relates to the field of beam assemblies installed on automobile panels to provide resistance to impacts.

BACKGROUND OF THE INVENTION

Protective structures for vehicles are generally known and are necessary for protecting vehicle occupants during a crash. For example, car doors are required to have a side impact structure installed in the interior of the door which extends along the length of the door. The purpose of the impact structure is to reinforce the automobile paneling on which the structures are installed and to absorb some of the forces generated during a crash to protect passengers seated adjacent to the doors. These structures are usually beams of various shapes. A protective beam for a vehicle must have sufficient strength to adequately protect the passengers of the vehicle during the crash in addition to having a specific yield or failure point so that crash loads can be dynamically absorbed. A typical protective beam is disclosed in U.S. Pat. No. 7,041,193, which consists of a tubular bar positioned from front to rear in a vehicle door. The structure includes a two-piece bracket in the middle of the bar that may be affixed to the bar by use of a curable adhesive. Brackets for interconnecting the bar and the door are attached to the ends of the tubular bar. The disadvantage of prior protective structures, such as those disclosed in U.S. Pat. No. 7,041,193, are the complex designs of the parts of the assembly, as well as the inability to allow fixturing movement during assembly before the final cure.

SUMMARY OF THE INVENTION

One embodiment of the invention includes a modular beam assembly comprising an elongate beam, a plurality of collars, a retaining cap, and a curable adhesive material. Each of the collars has a hole through which the elongate beam is inserted creating a slip fit, and the retaining cap is removably attached to at least one of the ends of the elongate beam to retain the elongate beam within the plurality of collars. As used herein, "slip fit" means to be held securely in place, but not so securely as to prevent some relative displacement between parts. The adhesive material is applied on at least one of the inner surface of at least one collar, a portion of the outer surface of the elongate beam located within a collar, and the surface of the portion of the retaining cap that is inserted into the end of the elongate beam. The collars, elongate beam, and retaining cap are fixed relative to each other once the adhesive material is cured.

Another embodiment of the invention includes an automobile panel assembly in which a modular beam assembly is installed onto an automobile panel.

Another embodiment of the invention is a method of assembling an automobile panel assembly comprising attaching one or more collars and optionally a retaining cap of a modular beam assembly, which also comprises adhesive material and an elongate beam, to an automobile panel and curing the adhesive material to prevent displacement of the elongate beam. The modular door assembly includes an elongate beam extending through a hole in the one or more collars, the hole forming an inner collar surface, a retaining cap positioned on one end of the elongate beam, and an adhesive material applied onto at least one of the elongate beam, the retaining cap, and the inner collar surface of at least one of the collars. The one or more collars and retaining cap of the modular beam assembly are configured to permit displacement of the elongate beam within the hole prior to curing of the adhesive material.

BRIEF DESCRIPTION OF THE DRAWINGS

The invention is further described by reference to the following Figures in which:

FIG. 3a is a top perspective view of a restraint cap according to one embodiment of the present invention;

FIG. 3b is a bottom view of the restraint cap illustrated in FIG. 3a;

FIG. 3c is a cross-sectional view of the restraint cap illustrated in FIG. 3b along line III-III;

FIG. 3d is a top perspective view of a restraint cap according to another embodiment of the present invention;

FIG. 3e is a bottom view of the restraint cap illustrated in FIG. 3d;

FIG. 3f is a cross-sectional view of the restraint cap illustrated in FIG. 3e along line IV-IV;

FIG. 3g is a top perspective view of a restraint cap according to yet another embodiment of the present invention;

FIG. 3h is a bottom view of the restraint cap illustrated in FIG. 3g;

FIG. 3i is a cross-sectional view of the restraint cap illustrated in FIG. 3h along line V-V;

DETAILED DESCRIPTION OF THE INVENTION

While protective structures, such as those of the present invention, may be installed in various environments to provide structural reinforcement against the force generated by external impacts, the description of the following embodiments is focused on the installation of protective structures in automobiles. The selection of automobiles as a possible environment in which the modular beam assembly of the present invention may be installed is not intended to limit the potential applications for the present invention, but rather to provide a simple and easily understood example of an environment in which the present invention may be found.

Figure 1:
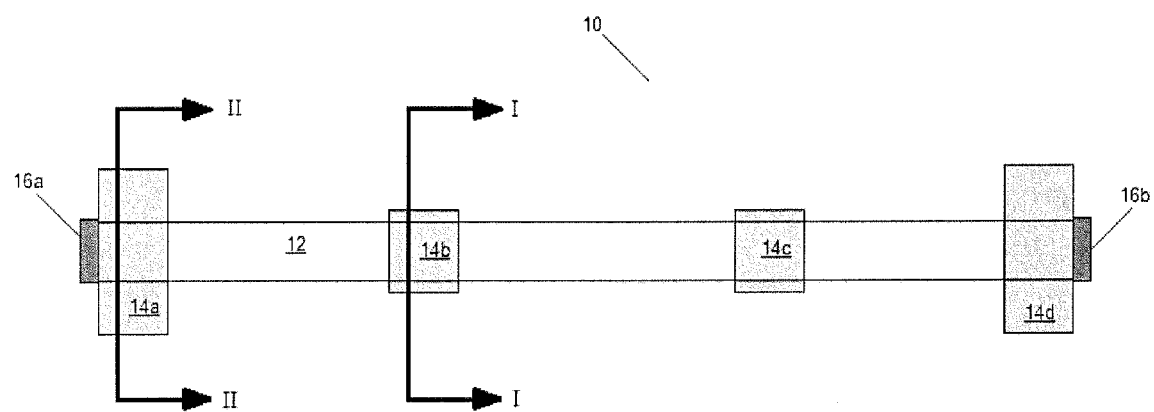
FIG. 1 is a modular beam assembly according to one embodiment of the present invention.

An embodiment of a modular beam assembly 10 according to the present invention is illustrated in FIG. 1 in which an elongate beam 12 is inserted through a plurality of collars 14a-14d and retaining caps 16a, 16b are positioned on opposite ends of the elongate beam 12. The retaining caps 16a, 16b interfere with the end collars 14a, 14d, and provide a stop to prevent the elongate beam 12 from sliding out of position within the plurality of collars 14a-14d. Either one or both retaining caps may be removably attached on the ends of the elongate beam.

The elongate beam 12 of the embodiment in FIG. 1 is cylindrical and hollow; however, protective beams may be solid or filled and provided in various shapes and lengths as known by those having skill in the art. For example, the shape of the cross-section of the beam taken perpendicular to the longitudinal axis of the beam may be square, oval, hat-shaped, W-shaped, and the like. Preferably, the cross-sectional shape of the beam closely matches the shape of the through-hole in the collar through which the beam is inserted. The elongate beam is preferably solid and made from a metal, such as steel, but may also be made of a polymer or a composite of various materials. The elongate beam may also be hollow and partially or completely filled with a material, such as a structural foam. The filler material may be similar or different than the material from which the beam is made. The type of materials, density of the elongate beam, number of collars used, and the spacing between the collars may be varied to achieve the desired reinforcement for the panel on which the modular beam assembly is installed.

Figure 2:
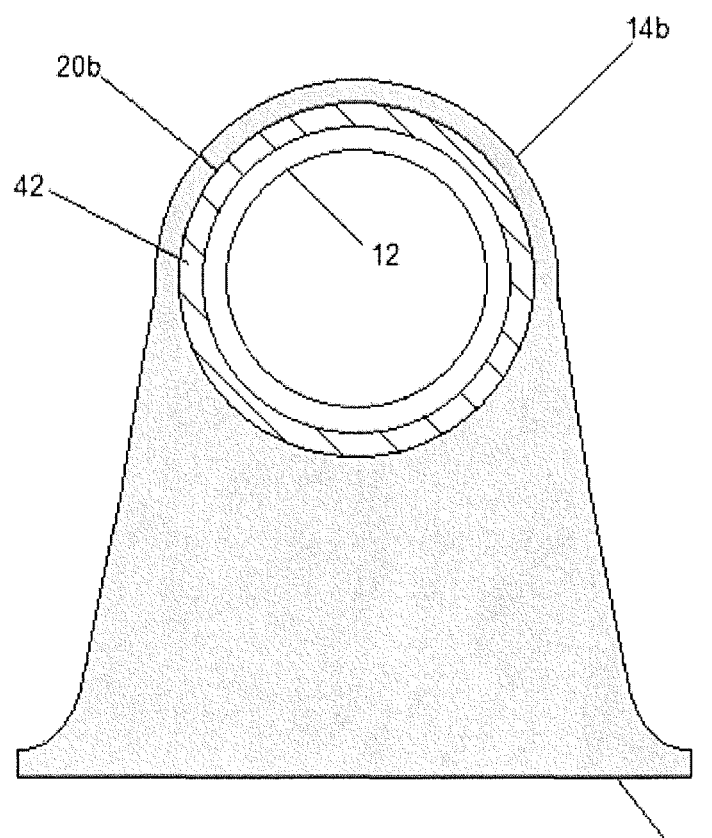
FIG. 2 is a cross-sectional view of the embodiment illustrated in FIG. 1 along line I-I.

Referring now to FIG. 2 in which a cross-sectional view of the collar 14b in FIG. 1 along line I-I is illustrated, the elongate beam 12 is positioned within a hole 20b or bore that extends through the thickness of the collar 14b. The hole forms an inner circumferential surface in opposing relation to the outer surface of the elongate beam 12. An adhesive material 42 occupies at least a portion of the annular space between the elongate beam 12 and the inner circumferential surface created by the hole 20b in the collar 14b. It is preferred that a slip fit is initially formed prior to curing of the adhesive material along the interface between the outer surface of the elongate beam and the inner surface of the plurality of collars. The base 22 of the collar 14b provides an area for attachment to a panel. Any attachment means may be used, while welding is preferred.

Figure 4:
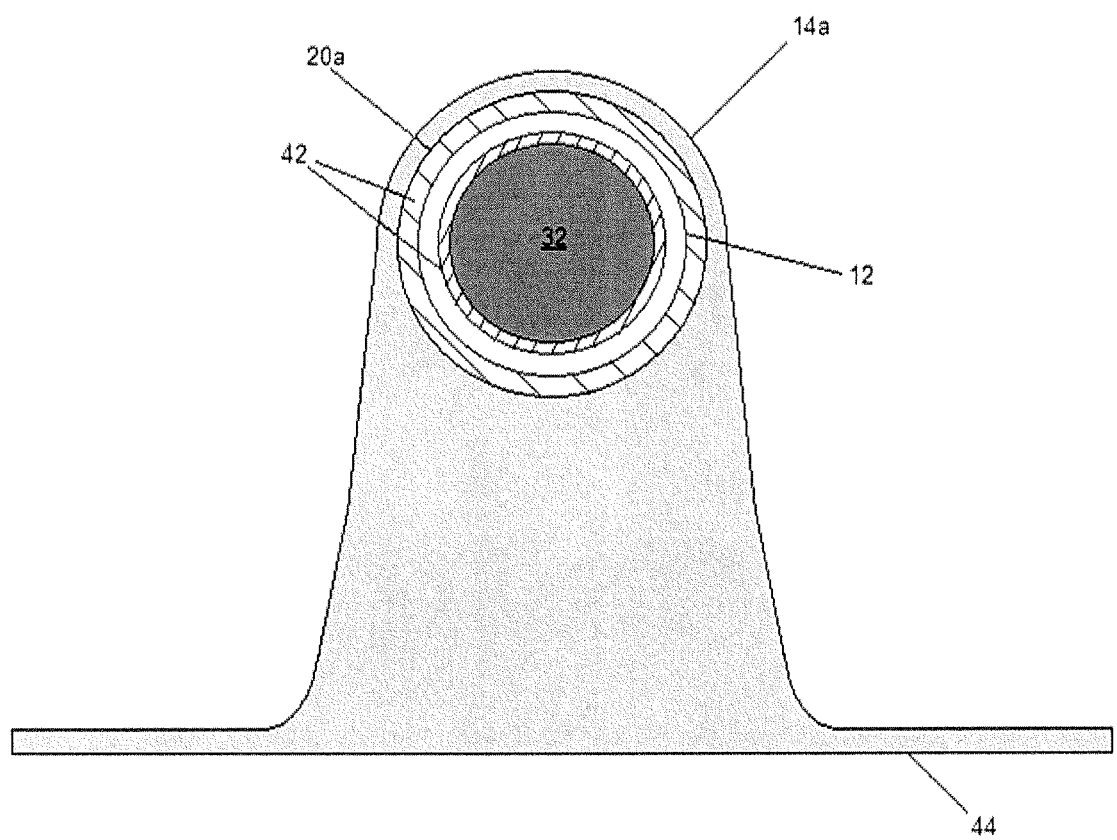
FIG. 4 is a cross-sectional view of the embodiment illustrated in FIG. 1 along line II-II.

The plurality of collars through which the elongate beam is inserted may be made of any material or have any shape. It is preferred that the material is steel or aluminum to coincide with the supporting structure material for ease of assembly and that the shape of the collar is such that a simple and inexpensive method of manufacturing the collars may be used, such as stamping or die extrusion. As illustrated in FIGS. 2 and 4, the through-holes in the collars result in the collar having a closed ring shape. The collars are not limited to the ring shape depicted in the various embodiments, but may also have an open configuration, such as a C-shape. However, it is preferred that the collars are closed as an open configuration may not transfer the load caused by an impact as a effectively as a closed configuration when the beam extending through the collars deflects.

The holes in the collars are preferably perpendicular to the surface of the collar in which the elongate beam is inserted. The holes should also be generally parallel to the base of the collars, so that the holes of each collar may be easily aligned thereby allowing the elongate beam to slide axially. The interface between the inner surface of the collar and outer surface of the elongate is preferably a slip fit. An interference fit is not desired, as an interference fit will not allow for axial displacement of the elongate beam. It is preferred that diameter of the hole is such that the height of the gap between the outer surface of the elongate beam and the inner surface of the collar is 0.1-2.0 mm, more preferably 0.25-1.75 mm, and most preferably 0.5-1.5 mm.

An advantage of the present invention is that the collars function as bulkheads providing reinforcement for the panel on which it is installed and provide a bearing surface around the circumference of the elongate beam. The area of bearing surface may be larger for the collars located near the ends of the elongate beam to allow the collars to bear a larger load and improve stress distribution along the length of the elongate beam. To provide additional strategic reinforcement, one or more of the collars, as well as a portion of the outer surface of the elongate beam, may optionally include surface features such as lands or grooves, to increase the bonding area for the adhesive material or to prevent rotation of the beam within the collar while allowing axial displacement. The overall height of the collars may also be varied depending on the desired distance between the elongate beam and the panel on which the assembly is installed, which also affects the desired reinforcement provided by the assembly.

As previously mentioned, the retaining caps of the modular beam assembly of the present invention assist in retaining the elongate beam within the plurality of collars. Three exemplary embodiments of the retaining cap according to the present invention are illustrated in FIGS. 3a-3i.

The first embodiment of the retaining cap illustrated in FIGS. 3a-3c is of the embodiment of the retaining cap 16a in FIG. 1, which has a head portion 30 and a projecting portion 32. The outer diameter of the head portion 30 is greater than the width of the hole in a collar to ensure that the head portion 30 interferes with an adjacent collar and provides a stop, thereby preventing an end of the elongate beam on which the retaining cap is positioned from sliding out of the collar. The projecting portion 32 of the retaining cap 16a has a diameter less than or equal to a bore on the inside of the elongate beam, such that the projecting portion 32 may be inserted in the end of the elongate beam.

The second embodiment of the retaining cap 33 illustrated in FIGS. 3d-3f has a top portion 34 which has a diameter greater than the hole of an adjacent collar. A circumferential wall 36 extends from the top portion 34, and the bottom of the circumferential wall 36 forms the stop which bears against the adjacent collar. An end of the elongate beam is then inserted into a bore 38 formed in the bottom of the retaining cap 33.

The features of the two embodiments of the retaining cap illustrated in FIGS. 3a-3f, which include a head portion, a projecting portion, a circumferential wall, and a bore, may be arranged in various combinations to form other embodiments of the retaining cap. For example, the third embodiment, retaining cap 31, illustrated in FIGS. 3g-3i includes the features of the retaining cap illustrated in FIGS. 3a-3c in addition to a bore 39 incorporated in the projecting portion 37, such that an end of the elongate beam is inserted into the bore 39 and the projecting portion 37 may have an outer diameter that allows insertion of the projecting portion 37 into the hole of a collar adjacent to the head portion 35 of the retaining cap 31. The head portion 35 has a diameter larger than the hole of the adjacent collar and therefore, provides the stop to prevent the elongate beam from sliding out of the hole of the collar.

It is preferred to provide an assembly in which the retaining cap and collar are two separate pieces. Unlike a configuration in which the retaining cap and an adjacent collar are combined as a single unitary piece, for example, providing a collar that is closed on one end, the present invention provides the advantage of being able to easily slide the collar along the elongate beam. Sliding the collar may be necessary in order to properly position the collar prior to welding the assembly in place.

Referring now to FIG. 4, a cross-sectional view of the collar 14a along line II-II in FIG. 1 is illustrated. Similar to the embodiment illustrated in FIG. 2, the elongate beam 12 is inserted through the hole 20a of the collar 14a with an adhesive material 42 occupying the annular space between the outer surface of the elongate beam 12 and the inner circumferential surface of the collar 14a formed by the hole 20a. As described above, the retaining cap may have a projecting portion 32 which is inserted into an end of the elongate beam 12. The adhesive material 42 may also occupy the annular space between the outer surface of the projecting portion 32 and the inner surface of the elongate beam 12. It is preferred that, prior to curing of the adhesive material, a slip fit exists at the interface between the inner surface of the collar and the outer surface of the elongate beam, as well as the opposing surfaces of the retaining cap and the elongate beam. The collar 14a illustrated in FIG. 4 may have a base member 44 which is larger than the area of the base for the collars along the middle portion of the elongate beam. The collars near the ends of the elongate beam may have a wider base to provide more surface contact between the beam assembly and the panel on which the beam assembly is attached. A larger base member provides a larger perimeter that may be welded to the panel, thus providing a stronger attachment between the collar and the panel.

Figure 5A:
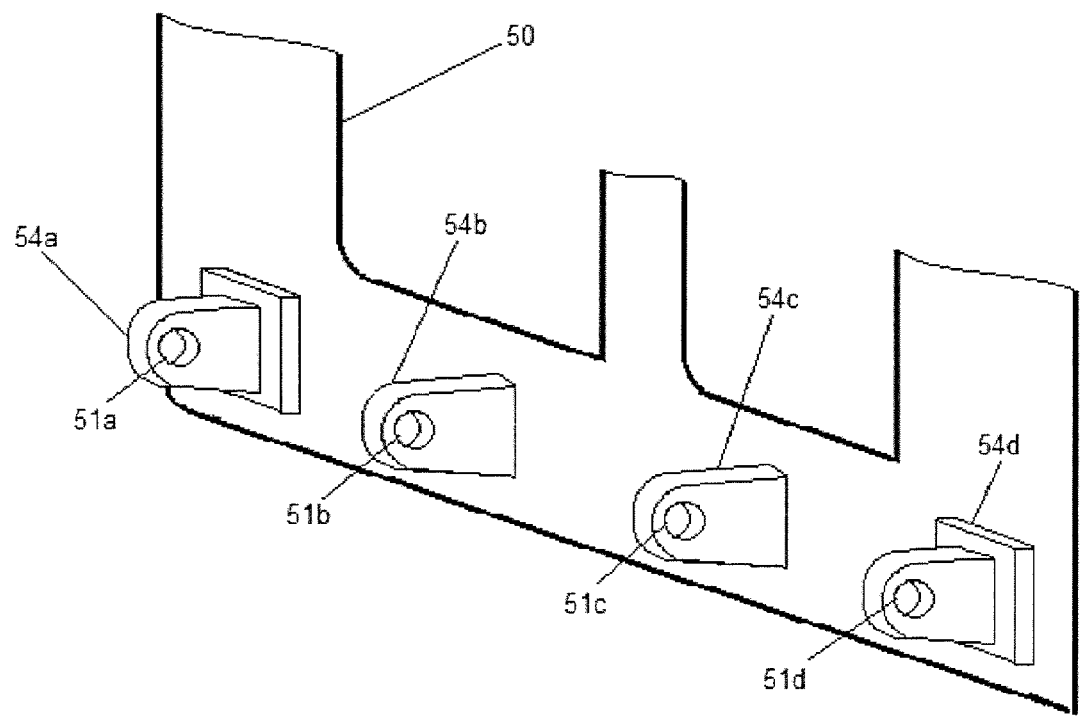
FIG. 5a is perspective view of an automobile panel assembly having collars according to an embodiment of the present invention in an installed condition.
Figure 5B:
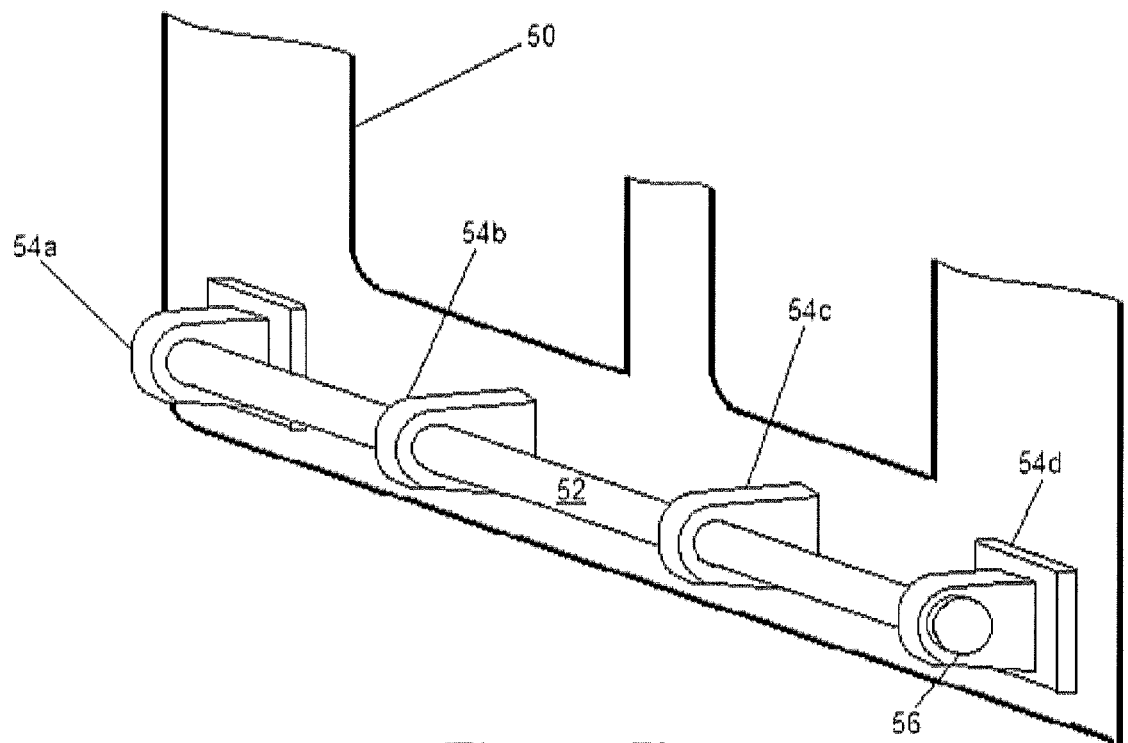
FIG. 5b is the perspective view of FIG. 5a with a beam and restraint caps installed in the collars according to an embodiment of the present invention.

It is preferred that the beam assembly is pre-assembled prior to attaching the beam assembly to the automobile panel. The slip fit between the collars and the elongate beam prevent the collars from sliding along the elongate beam and out of position during shipment of the assembly before the adhesive material has had an opportunity to cure. For certain applications, such as an automobile door panel, it may be critical to provide the beam assembly pre-assembled because it will be impossible to insert the elongate beam into the collars once the collars are welded in place. Referring to FIGS. 5a and 5b, an automobile panel assembly according to one embodiment of the present invention is illustrated comprising a beam assembly and automobile panel. An elongate beam 52 is inserted through a hole 51a-51d in each of the collars 54a-54d, and a retaining cap 56 is positioned on an end of the elongate beam 52 which has a diameter larger than the hole 51d of the adjacent collar to provide a stop. A retaining cap may be positioned on one or both ends of the elongate beam, such that the elongate beam is maintained within the holes of the collars. The plurality of collars 54a-54d of a beam assembly are attached to a rocker panel 50, preferably by welding.

An advantage of the present invention is that an adhesive material may be applied to the contact surface between the elongate beam, the plurality of collars, and the retaining cap, thus reducing the amount of welding that is needed to fabricate and install the beam assembly. By reducing the amount of welding, the present invention may reduce or eliminate the undesired heat effects caused by welding, such as warping, twisting, or morphology changes to the material due to heat penetration.

Because the adhesive material may replace a weld, an adhesive material may be selected that will exhibit the same strength and weight, particularly when exposed to the force of an impact. The adhesive material may cure or foam upon being activated and may be activated using any typical method known by those of skill in the art, such as by exposure to a chemical activator, moisture, radiation, or temperature. The adhesive material may also incorporate additives to impart properties, such as the ability of the material to insulate. The adhesive material is preferably an epoxy based polymeric material that is a heat curable structural adhesive or foam, such as the Teroson® 1811, 1470, 1477, and 5089 adhesives sold by Henkel AG & Co. KGaA. For example, the adhesive material may comprise an epoxy resin, a heat-activated curing agent (i.e., a curative capable of curing the epoxy resin when the adhesive material is heated to an elevated temperature), as well as optionally one or more additives selected from the group consisting of impact modifiers, expansion agents (blowing agents), stabilizers, colorants, fillers, thermoplastics, rubbers, and the like. In one embodiment, the adhesive material is formulated so as to be dimensionally stable at room temperature. The adhesive material may be non-tacky at room temperature or, in another embodiment, have pressure sensitive characteristics at room temperature. In still another embodiment, the components of the adhesive material may be selected such that the adhesive material can be formed as a thermoplastic-like composition into a desired shape or configuration by extrusion, injection molding, or the like at a temperature above room temperature but less than the temperature at which curing is initiated. In such an embodiment, the adhesive material may have hot melt adhesive characteristics, wherein a mass of the adhesive material may be applied to a surface while warm and adhere to that surface when cooled to room temperature.

The adhesive material may be applied at any point during the manufacturing process and applied as a strip or injected into the space between the interface of the various parts of the beam assembly. The amount, coverage area, or volume occupied by the adhesive material may be varied depending on dimensions of the parts of the beam assembly and the desired bond between the parts. It is preferably applied as an adhesive strip to the individual parts during pre-assembly of the beam assembly and cured during a point of the manufacturing process when the panel has been installed and is exposed to high temperatures. For example when the invention is incorporated in an automobile door panel, the adhesive material may be selected such that curing will occur after installation of the door and during a manufacturing step, such as a paint cure step, when the automobile will be exposed to high temperatures in a bake oven or the like. An additional manufacturing step to cure the adhesive material is therefore unnecessary.

Another advantage of the present invention is that displacement of the elongate beam, in particular, displacement of the elongate beam along its longitudinal axis, is permitted until curing of the adhesive material. In general, linear displacement as a result of thermal expansion is not a great concern as most strains in the elongate beam are expected to occur in the radial direction, i.e. expansion and contraction of the diameter. However, the present invention does not fix the ends of the elongate beam prior to curing. The beam may be allowed to slip or displace within the holes of the collars without affecting the panel to which the beam assembly is attached. For example in the embodiments of the invention illustrated in FIGS. 1 and 5b, when the elongate beam is exposed to high and low temperatures that are lower than the activation temperature of the adhesive material, the elongate beam may move in the longitudinal direction. At the same time, the retaining cap(s) slidably retain the elongate beam within the collars, allowing it to slide, but preventing the elongate beam from falling out of the collars or moving greatly out of position prior to completely curing the adhesive material.

The interface between the retaining cap and the elongate beam, like the interface between the elongate beam and the collars, should be a slip fit. The slip fit enables the retaining cap to maintain the elongate beam in position during curing and is expected to prevent the retaining cap from falling off during shipment or final installation. The slip fit provides the advantage of allowing the retaining cap to be removed by hand in case repair or manipulation of the assembly is required during installation. The surface of the retaining cap and/or the surface of the elongate beam may optionally include an anomaly such as a divot or scribe, or alternatively may be threaded to achieve the same advantages; however, such features require additional manufacturing steps, unlike the use of a slip fit.

Thus, the present invention prevents strain on the beam assembly which is likely to result in a warped panel on which the beam assembly is welded and prevents any downstream effects on the manufacturing process which uses the panel, such as an automobile production process. By preventing strain the present invention may also maintain the structural integrity of the beam assembly and ensure its effectiveness as a safety feature should the beam assembly be impacted during a crash.

Yet another advantage of the present invention is reduction in the complexity of the design. For example, in the area of automobile manufacture, if two different automobile models have panels with welding points for the collar in different locations, the present invention may be installed on the different models by merely sliding the collars into the appropriate position for either panel. Manufacturing is thereby improved by allowing the use of common parts on different models. Installation may also be easier because the collars are permitted to slide along the length of the elongate beam, which provides a welder with more freedom to position the collars within the boundary of a panel.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed:

1. An automobile panel assembly comprising:
    a panel; and
    a modular beam assembly, the modular beam assembly comprising,
    an elongate beam having a first end portion and a second end portion;
    at least one collar having a through-hole through which one of the first and second end portions of the elongate beam extends, the collar being attached to the panel and having an inner collar surface;
    a retaining cap positioned on one of the first and second end portions of the elongate beam, the retaining cap including a stop that interferes with the collar and prevents the first or second end portion from sliding out of the collar; and
    an adhesive material applied on at least one of the elongate beam, the retaining cap, and the inner collar surface of the collar,
    wherein the retaining cap and the collar are configured to permit axial displacement of the elongate beam within the collar prior to curing of the adhesive material.

2. The automobile panel assembly of claim 1, wherein the collar is in the form of a closed ring.

3. The automobile panel assembly of claim 1, wherein a slip fit is formed between at least one of (1) the inner collar surface and an outer surface of the elongate beam and (2) the elongate beam and the retaining cap.

4. The automobile panel assembly of claim 1, wherein said adhesive material is heat curable.

5. The automobile panel assembly of claim 1, wherein said adhesive material is at least one of a structural adhesive and a structural foam.

6. The automobile panel assembly of claim 1, wherein at least one of the elongate beam and plurality of collars are made of steel.

7. A method of assembling the automobile panel assembly of claim 1 comprising:
    attaching the at least one collar of the modular beam assembly to the panel,
    curing the adhesive material to prevent displacement of the elongate beam.

8. The method of claim 7, wherein said curing occurs during heating of the automobile panel.

9. The method of claim 7, wherein prior to the curing step, the modular beam assembly includes a slip fit between at least one of (1) the inner collar surface and an outer surface of the elongate beam and (2) the elongate beam and the retaining cap.

10. The method of claim 7, wherein at least one of the elongate beam and one or more collars of the modular beam assembly are made of steel.

11. The method of claim 7, wherein said adhesive material is at least one of a structural adhesive and a structural foam.

12. The automobile panel assembly of claim 1, wherein the collar is C-shaped.

13. The automobile panel assembly of claim 1, wherein a gap between the outer surface of the elongate beam and the inner surface of the collar is 0.1-2.0 mm.

14. The automobile panel assembly of claim 1, wherein the modular beam assembly comprises a plurality of collars, the inner collar surface of each collar providing a bearing surface around the circumference of the elongate beam, and the area of the bearing surface of at least one of the collars located near the ends of the elongate beam is greater than the area of the bearing surface of at least one of the other collars.

15. The automobile panel assembly of claim 1, wherein at least one of the collar and a portion of the outer surface of the elongate beam includes surface features configured to at least one of increase the bonding area for the adhesive material and to prevent rotation of the elongate beam within the collar while allowing axial displacement.

16. The automobile panel assembly of claim 1, wherein the retaining cap includes a projecting portion and the projecting portion is inserted in a bore at an end of the elongate beam.

17. The automobile panel assembly of claim 1, wherein the retaining cap includes a bore and an end of the elongate beam is inserted into the bore.

* * * * *